(12) United States Patent
McMahan et al.

(10) Patent No.: US 12,371,180 B2
(45) Date of Patent: Jul. 29, 2025

(54) LONG THROW LATCH FOR AIRCRAFT SYSTEM

(71) Applicant: Rohr, Inc., Chula Vista, CA (US)

(72) Inventors: Paul F. McMahan, College Station, TX (US); Braskel Phillips, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 143 days.

(21) Appl. No.: 18/130,236

(22) Filed: Apr. 3, 2023

(65) Prior Publication Data

US 2024/0327010 A1    Oct. 3, 2024

(51) Int. Cl.
| | | |
|---|---|---|
| B64D 29/06 | (2006.01) | |
| E05B 13/10 | (2006.01) | |
| E05B 15/00 | (2006.01) | |
| E05C 5/02 | (2006.01) | |

(52) U.S. Cl.
CPC ............ *B64D 29/06* (2013.01); *E05B 13/101* (2013.01); *E05B 15/0086* (2013.01); *E05C 5/02* (2013.01)

(58) Field of Classification Search
CPC ........ E05C 19/14; E05C 19/10; E05C 19/145; B64D 29/06; E05B 15/0086; E05B 65/0817
See application file for complete search history.

(56) References Cited

U.S. PATENT DOCUMENTS

| | | |
|---|---|---|
| 2,712,955 A | 7/1955 | Andrews |
| 2,750,217 A | 6/1956 | Landholt |
| 2,904,141 A | 9/1959 | Henrichs |
| 4,053,177 A | 10/1977 | Stammreich |
| 4,183,564 A | 1/1980 | Poe |
| 4,318,557 A | 3/1982 | Bourne |
| 4,602,812 A | 7/1986 | Bourne |
| 4,743,052 A | 5/1988 | Stammreich |
| 4,768,815 A | 9/1988 | Harmon |
| 4,858,970 A | 8/1989 | Tedesco |
| 5,152,559 A | 10/1992 | Henrichs |
| 5,620,212 A | 4/1997 | Bourne |

(Continued)

FOREIGN PATENT DOCUMENTS

EP    0431769 B1    12/1993

OTHER PUBLICATIONS

EP Search Report for EP Patent Application No. 24168319.2 dated Feb. 14, 2025.

*Primary Examiner* — Kristina R Fulton
*Assistant Examiner* — Christopher F Callahan
(74) *Attorney, Agent, or Firm* — Getz Balich LLC

(57) ABSTRACT

An apparatus is provided for an aircraft. This apparatus includes a latch. The latch includes a handle, a hook structure and a linkage system operatively coupling the handle to the hook structure. The linkage system includes a back link, a center link, a back link pivot member and a center link pivot member. The hook structure includes a hook, a structure aperture and a structure slot located longitudinally between the hook and the structure aperture. The back link is pivotally coupled to the center link. The back link pivot member is received within the structure aperture and pivotally couples the back link to the hook structure. The center link pivot member is received within the structure slot and pivotally couples the handle and the center link together and to the hook structure.

19 Claims, 12 Drawing Sheets

(56) References Cited

U.S. PATENT DOCUMENTS

| | | |
|---|---|---|
| 5,915,765 A | 6/1999 | Sternberger |
| 5,984,382 A | 11/1999 | Bourne |
| 6,036,238 A | 3/2000 | Lallament |
| 6,279,971 B1 | 8/2001 | Dessenberger, Jr. |
| 6,343,815 B1 * | 2/2002 | Poe ................. E05C 19/145 |
| | | 292/DIG. 31 |
| 7,066,501 B2 | 6/2006 | Meineke |
| 9,617,767 B1 * | 4/2017 | Baic ................. E05C 19/145 |
| 10,173,782 B2 | 1/2019 | Hernandez |
| 11,102,046 B2 | 8/2021 | Kim |
| 11,193,305 B2 | 12/2021 | Helsley |
| 2016/0347465 A1 * | 12/2016 | Mellor ................. B64D 29/06 |
| 2022/0195765 A1 | 6/2022 | McMahan |
| 2023/0250682 A1 * | 8/2023 | Newell ................. E05C 19/145 |
| | | 292/259 A |

* cited by examiner

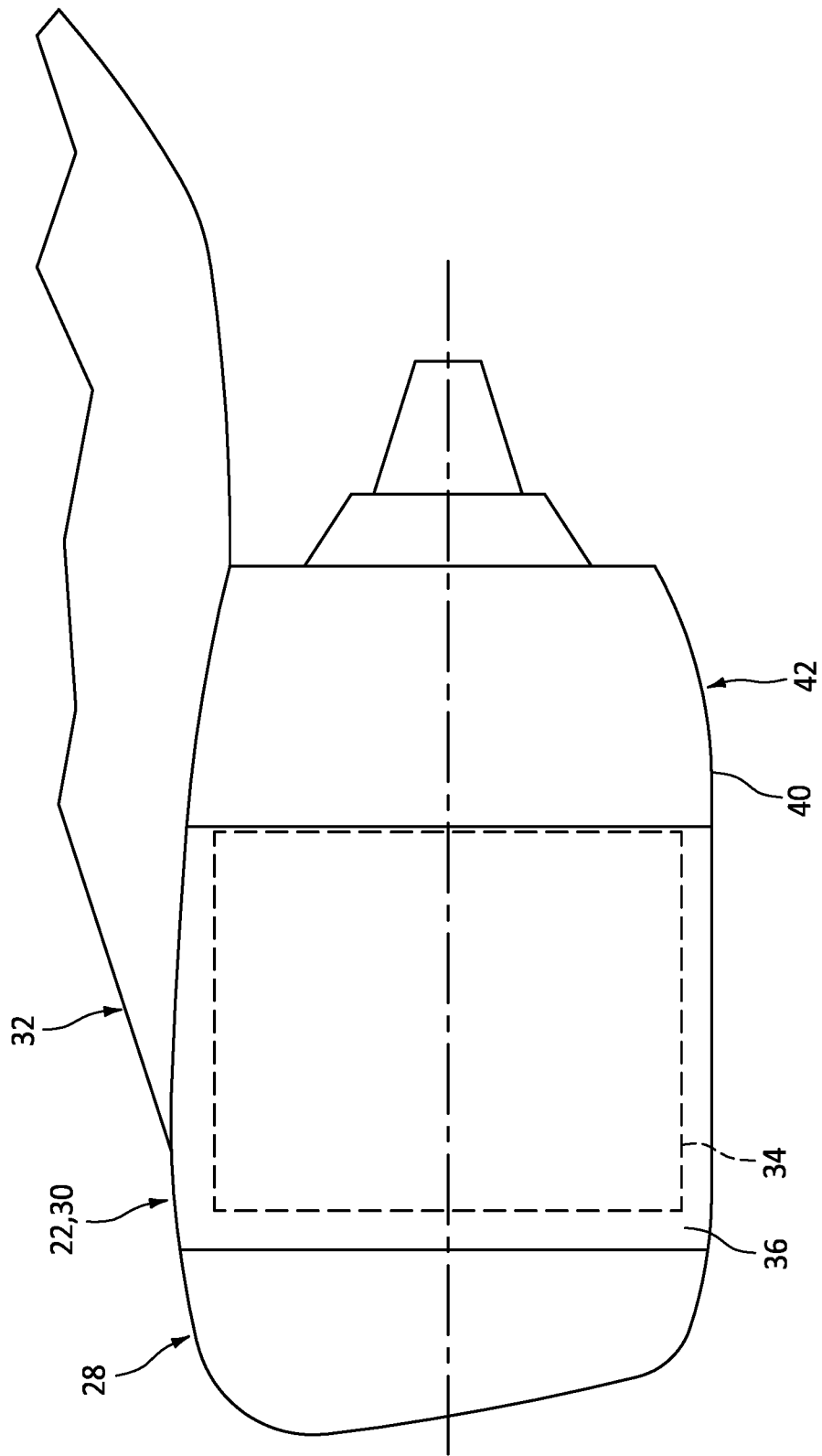

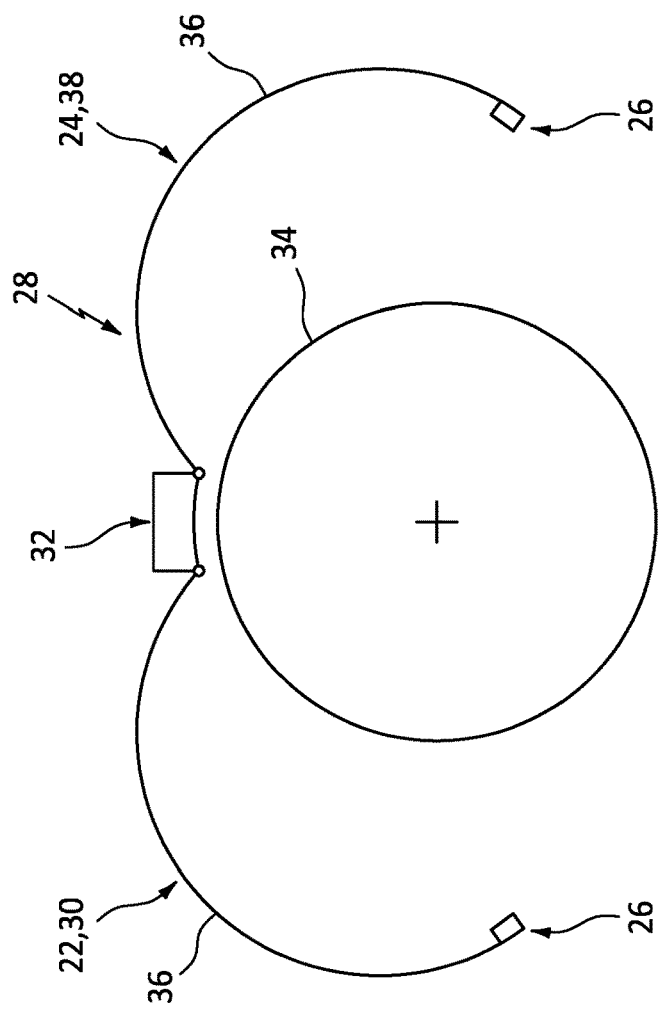
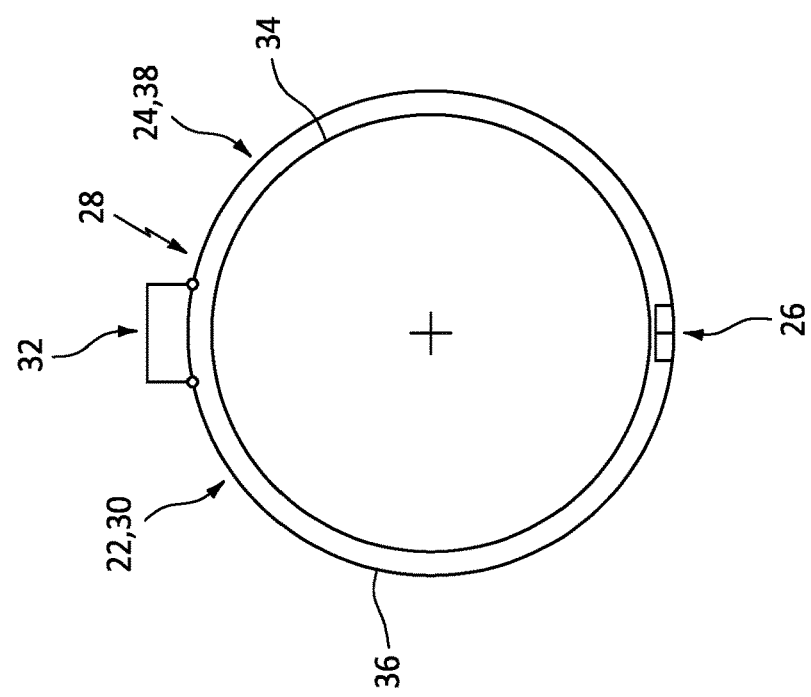
FIG. 4
FIG. 3

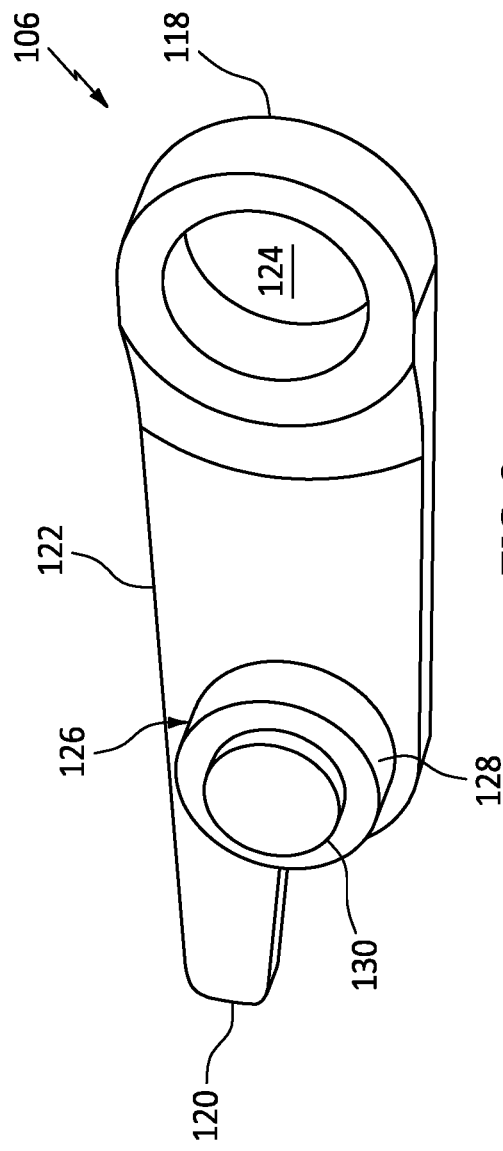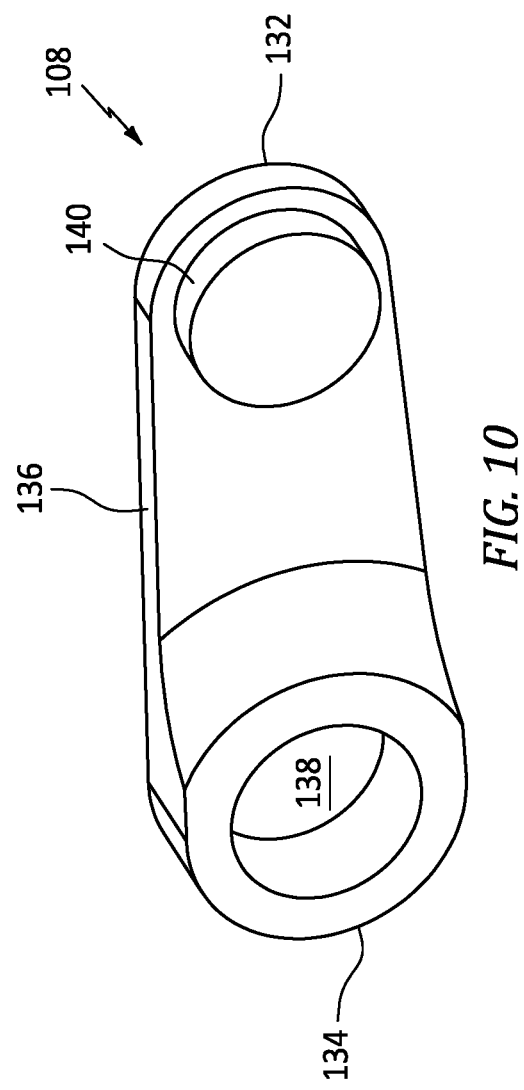

LONG THROW LATCH FOR AIRCRAFT SYSTEM

BACKGROUND

1. Technical Field

This disclosure relates generally to a latch assembly for a structure such as, for example, an aircraft cowl.

2. Background Information

A modern aircraft propulsion system typically includes a gas turbine engine and a nacelle housing and providing an aerodynamic covering for the gas turbine engine. The nacelle may include one or more cowls for covering components of the gas turbine engine. These cowls may be pivotally mounted to a stationary structure enabling those cowls to be opened for providing access to the components underneath. The cowls may be secured in a closed position using one or more latch assemblies. Various types and configurations of latch assemblies are known in the art. While these known latch assemblies have various benefits, there is still room in the art for improvement.

SUMMARY OF THE DISCLOSURE

According to an aspect of the present disclosure, an apparatus is provided for an aircraft. This apparatus includes a latch. The latch includes a handle, a hook structure and a linkage system operatively coupling the handle to the hook structure. The linkage system includes a back link, a center link, a back link pivot member and a center link pivot member. The hook structure includes a hook, a structure aperture and a structure slot located longitudinally between the hook and the structure aperture. The back link is pivotally coupled to the center link. The back link pivot member is received within the structure aperture and pivotally couples the back link to the hook structure. The center link pivot member is received within the structure slot and pivotally couples the handle and the center link together and to the hook structure.

According to another aspect of the present disclosure, another apparatus is provided for an aircraft. This apparatus includes a latch. The latch includes a handle, a hook structure and a linkage system operatively coupling the handle to the hook structure. The linkage system includes a front link, a center link, a front link pivot member and a center link pivot member. The hook structure includes a structure slot. The front link is pivotally coupled to the center link. The front link pivot member is received within the structure slot and pivotally couples the front link to the hook structure. The center link pivot member is received within the structure slot and pivotally couples the handle and the center link together and to the hook structure.

According to still another aspect of the present disclosure, another apparatus is provided for an aircraft. This apparatus includes a keeper and a latch. The latch includes a handle and a hook structure operatively coupled to the handle. The handle is configured to move between a closed position and an open position. The hook structure is engaged with the keeper when the handle is in the closed position. The hook structure is disengaged from the keeper when the handle is in the open position. The latch also includes a back cover plate and a front cover plate pivotally coupled to the back cover plate. The back cover plate is pivotally coupled to the hook structure. The front cover plate is pivotally coupled to the handle. The back cover plate, the front cover plate and an exterior of the handle are inline when the handle is in the closed position.

The center link pivot member may be configured to translate longitudinally within the structure slot as the handle and/or the center link pivots relative to the hook structure. The front link pivot member may be configured to translate longitudinally within the structure slot as the handle and/or the center link pivots relative to the hook structure.

The hook structure may also include a hook. The front link pivot member may be longitudinally between the center link pivot member and the hook along the hook structure.

The latch may also include a back link that is independently pivotally coupled to the hook structure and the center link.

The center link pivot member may be configured to translate longitudinally within the structure slot as the handle and/or the center link pivots relative to the hook structure.

The linkage system may also include a front link and a front link pivot member. The front link may be pivotally coupled to the center link. The front link pivot member may be received within the structure slot and pivotally couple the front link to the hook structure.

The front link pivot member may be configured to translate longitudinally within the structure slot as the handle and/or the center link pivots relative to the hook structure.

The front link pivot member may be longitudinally between the center link pivot member and the hook.

The handle may include a handle slot. The front link may include a protrusion that projects through the center link and into the handle slot.

The back link may be pivotally coupled to the center link at a back location. The front link may be pivotally coupled to the center link a front location. The center link pivot member may be disposed at a center location between the back location and the front location along the center link.

The apparatus may also include a latch housing and a fastener. The latch housing may include a channel. The latch may be disposed within the channel. The fastener may project through the front link pivot member to mount the latch to the latch housing.

The latch may also include a back cover plate and a front cover plate pivotally coupled to the back cover plate. The back cover plate may be pivotally coupled to the hook structure. The front cover plate may be pivotally coupled to the handle.

The back cover plate, the front cover plate and an exterior of the handle may be inline and substantially parallel when the handle is in a closed position.

The latch may also include a handle release device with a push button. The handle release device may be configured to lock the handle in a closed position when the push button is in a first position. The handle release device may be configured to unlock the handle from the closed position when the push button is in a second position.

The push button may be nested in an aperture in the handle.

The handle release device may be pivotally mounted to the handle.

The apparatus may also include a keeper. The handle may be configured to move between a closed position and an open position. The hook may be engaged with the keeper when the handle is in the closed position. The hook may be disengaged from the keeper when the handle is in the open position.

The apparatus may also include a fixed structure, a first aircraft component and a second aircraft component. The first aircraft component may be pivotally attached to the fixed structure. The latch may be mounted to the first aircraft component. The second aircraft component may be pivotally attached to the fixed structure. The keeper may be mounted to the second aircraft component.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 2 is a side illustration of an aircraft propulsion system.

FIG. 3 is a schematic cross-sectional illustration of the aircraft propulsion system with its cowls in closed positions.

FIG. 4 is a schematic cross-sectional illustration of the aircraft propulsion system with its cowls in open positions.

FIG. 9 is a perspective illustration of a front link for the latch.

FIG. 10 is a perspective illustration of a back link for the latch.

DETAILED DESCRIPTION

Figure 1:
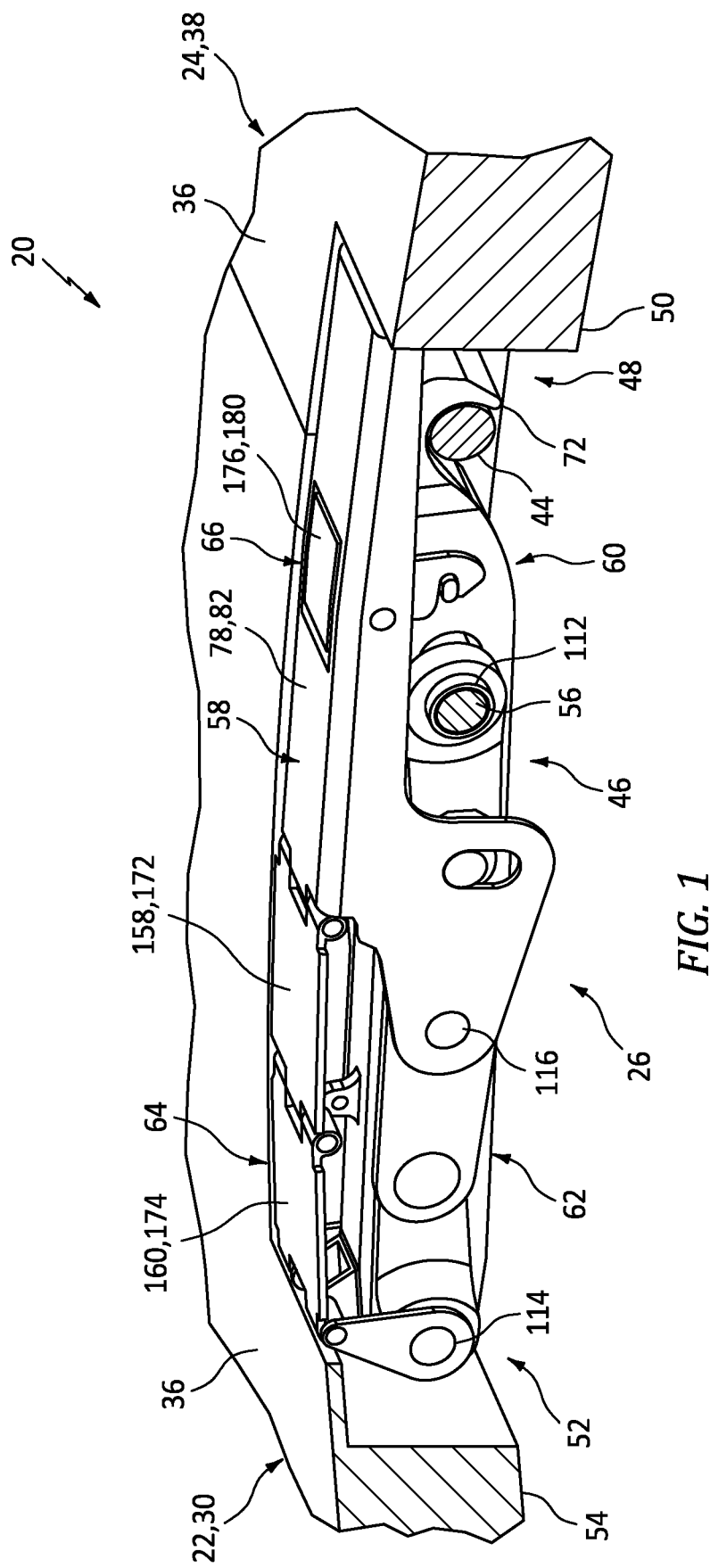
FIG. 1 is a partial cutaway perspective illustration of an aircraft assembly with a latch in a closed position.

FIG. 1 illustrates an assembly 20 for an aircraft structure. An example of the aircraft structure is a nacelle for an aircraft propulsion system, where the nacelle houses an aircraft propulsion system powerplant such as, but not limited to, a gas turbine engine. Another example of the aircraft structure is an aircraft fuselage. The assembly 20 of the present disclosure, however, is not limited to the foregoing exemplary aircraft structures. The assembly 20 of FIG. 1 includes one or more aircraft components 22 and 24 and a long throw latch assembly 26.

Referring to FIGS. 2-4, the first component 22 may be configured as part of an outer nacelle structure 28 for the aircraft propulsion system nacelle. The first component 22 of FIGS. 2-4, for example, may be configured as or otherwise include a first fan cowl 30 of the outer nacelle structure 28. This first fan cowl 30 is movably (e.g., pivotally) connected to a stationary structure 32 of the aircraft; e.g., a pylon structure for the aircraft propulsion system. The first fan cowl 30 is configured to move (e.g., pivot) between a fully closed position (e.g., see FIGS. 2 and 3) and a fully open position (e.g., see FIG. 4). In the closed position of FIG. 3, the first fan cowl 30 is configured to house and provide a first side aerodynamic covering for a fan case 34 for the powerplant. The first fan cowl 30 also partially forms an exterior aerodynamic surface 36 of the aircraft propulsion system nacelle.

The second component 24 may be configured as part of the outer nacelle structure 28. The second component 24 of FIGS. 3 and 4, for example, may be configured as or otherwise include a second fan cowl 38 of the outer nacelle structure 28, which second fan cowl 38 is arranged opposite the first fan cowl 30. This second fan cowl 38 is movably (e.g., pivotally) connected to the stationary structure 32. The second fan cowl 38 is configured to move (e.g., pivot) between a fully closed position (e.g., see FIG. 3) and a fully open position (e.g., see FIG. 4). In the closed position of FIG. 3, the second fan cowl 38 is configured to house and provide a second side aerodynamic covering for the fan case 34. The second fan cowl 38 also further forms the exterior aerodynamic surface 36 of the aircraft propulsion system nacelle.

The aircraft components 22 and 24 may be described herein as the fan cowls 30 and 38 for ease of description. It should be recognized, however, the latch assembly 26 may be configured with other components of the aircraft propulsion system or the aircraft fuselage. For example, referring to FIG. 2, each aircraft component 22, 24 may alternatively be configured as a respective section 40 (e.g., half; one visible in FIG. 2) of a thrust reverser 42, where the thrust reverser section 40 may be movably (e.g., pivotally) attached to the stationary structure 32 or another structure in a similar manner as described above with respect to the respective fan cowl 30, 38. The present disclosure therefore is not limited to any particular aircraft component configurations. Furthermore, while both aircraft components 22 and 24 are described as movable (e.g., pivotable) structures, it is contemplated one of the aircraft components 22 or 24 may alternatively be configured as a fixed structure of the aircraft.

Referring again to FIG. 1, the latch assembly 26 is arranged at an interface between the first component 22 and the second component 24. The latch assembly 26 is configured to lock the (e.g., closed) aircraft components 22 and 24 together when the latch assembly 26 is closed/locked. The latch assembly 26 may thereby secure the first component 22 to the second component 24 when the latch assembly 26 is closed/locked. The latch assembly 26 is also configured to unlock the (e.g., closed) aircraft components 22 and 24 when the latch assembly 26 is open/unlocked. The latch assembly 26 may thereby enable movement of the first component 22 relative to the second component 24 (e.g., pivoting open each aircraft component) when the latch assembly 26 is open/unlocked; e.g., see FIG. 5. The latch assembly 26 of FIG. 1 includes a keeper 44 and a long throw latch 46.

The keeper 44 of FIG. 1 is (e.g., fixedly) mounted to the second component 24. The keeper 44, for example, may be disposed within and extend across a channel 48 in a fitting 50 of the second component 24. Each end of the keeper 44 may be connected to a respective side (e.g., flange, wall, etc.) of the second component fitting 50. The keeper 44 may be configured as a pin, a rod, a fastener or any other elongated body that may mate with the latch 46 as described below.

The latch 46 is (e.g., movably) mounted to the first component 22. The latch 46, for example, may be disposed within a channel 52 in a fitting 54 of the first component 22. A latch anchor 56 extends through at least one component of the latch 46 and across the channel 52 in the first component fitting 54. Each end of the latch anchor 56 may be connected to a respective side (e.g., flange, wall, etc.) of the first component fitting 54. The latch anchor 56 forms a pivot axis about which the latch 46 may pivot and move between its closed/locked arrangement (e.g., see FIG. 1) and its open/unlocked arrangement (e.g., see FIG. 5). The latch anchor 56 may be configured as a pin, a rod, a fastener or any other elongated body that may mate with the latch 46 as described below.

Figure 6:
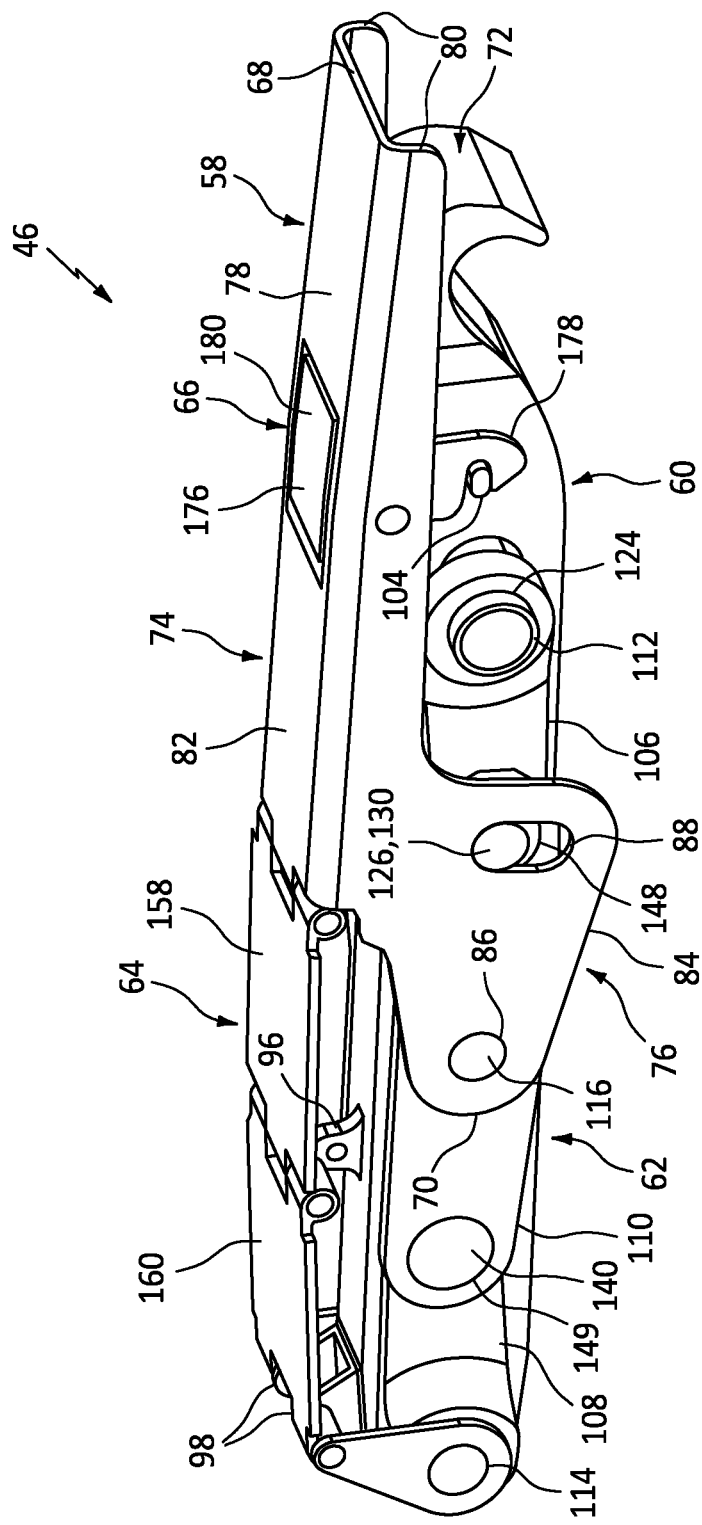
FIGS. 6 and 7 are perspective illustrations of the latch in open and closed positions.
Figure 7:
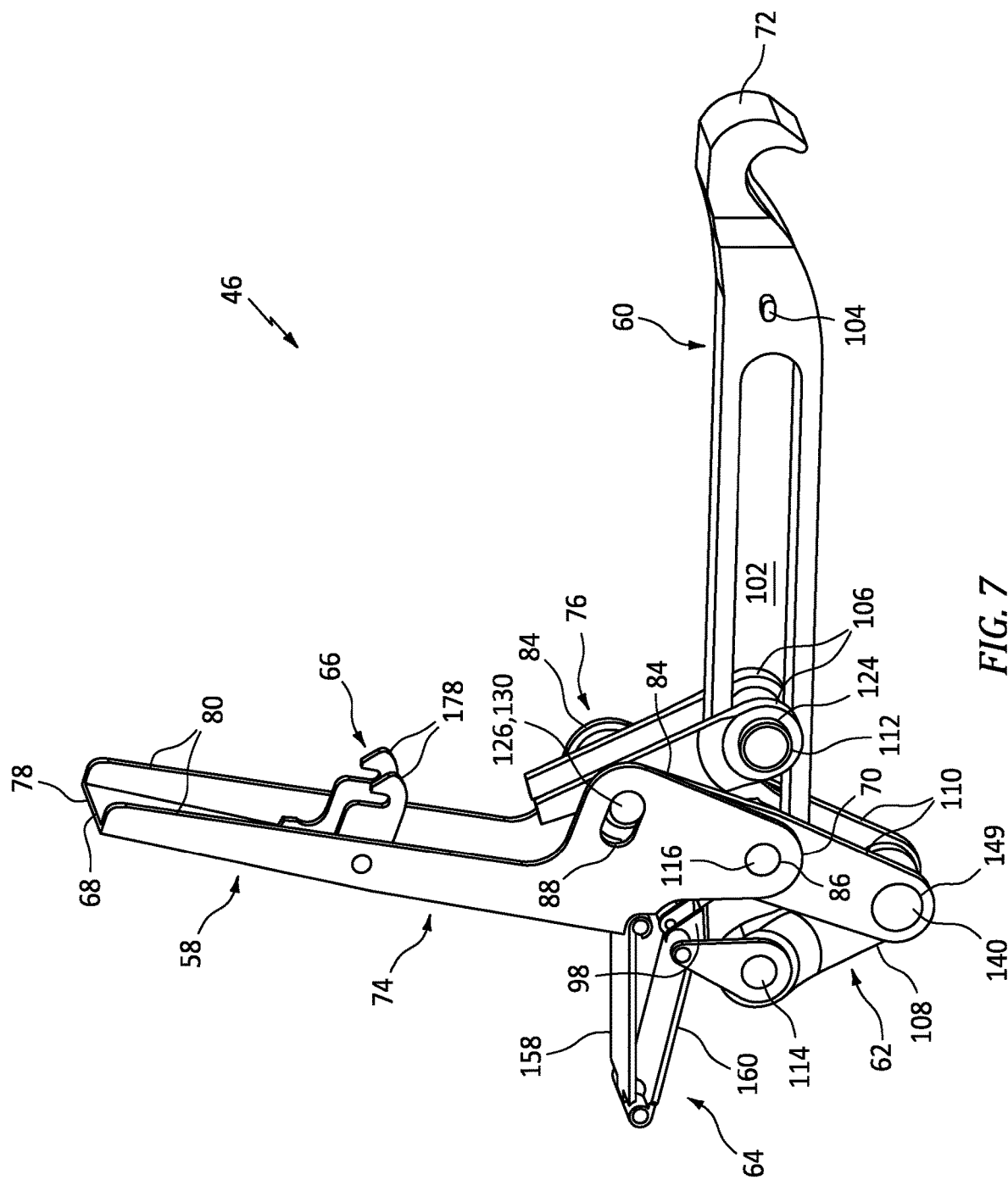

Referring to FIGS. 6 and 7, the latch 46 includes a latch handle 58, a latch hook structure 60 and a latch linkage system 62 operatively coupling the handle 58 to the hook structure 60. The latch 46 may also include a cover assembly 64 and/or a handle release device 66.

The handle 58 extends longitudinally (when closed) between and to a front end 68 of the handle 58 and a back end 70 of the handle 58. Here, with respect to the elements of the latch 46, the terms "front" and "back" are used to describe a position of a respective latch element relative to a hook 72 of the hook structure 60 and need not correspond to front and back positions of the aircraft structure in general. The handle 58 includes a grip portion 74 and a mount portion 76.

The grip portion 74 is connected to the mount portion 76 and projects longitudinally to the handle front end 68. The grip portion 74 of FIGS. 6 and 7 includes a handle base 78 and a plurality of handle rails 80. The handle base 78 forms an exterior of the handle 58 when the handle 58 is in a fully closed position (see FIG. 6). The handle base 78 of FIG. 1, for example, forms an exterior surface 82 of the handle 58 that may be substantially inline with (e.g., parallel and/or flush with) the exterior aerodynamic surface 36 when the handle 58 is in its closed position and, more generally, when the latch assembly 26 is closed/locked. Referring again to FIGS. 6 and 7, the handle rails 80 are disposed to (e.g., on) opposing lateral sides of the handle base 78 and, more generally, the handle 58 and its grip portion 74. Each of the handle rails 80 is connected to the handle base 78 and extends longitudinally along the handle base 78. Each of the handle rails 80 projects vertically inward (e.g., a direction away from the exterior surface 82) from the handle base 78.

The mount portion 76 is arranged at (e.g., on, adjacent or proximate) the handle back end 70. The mount portion 76 of FIGS. 6 and 7 includes a plurality of handle mounts 84; e.g., tabs, flanges, etc. Each of the mounts 84 may be formed as an extension of a respective one of the handle rails 80. Each mount 84 of FIGS. 6 and 7 projects vertically inward from the respective handle rail 80. Each mount 84 projects longitudinally away from the grip portion 74 of the respective handle rail 80 to the handle back end 70. Each mount 84 of FIGS. 6 and 7 includes a handle mounting aperture 86 ("handle aperture") and a handle retaining slot 88 ("handle slot"). The handle aperture 86 is disposed at the handle back end 70. This handle aperture 86 may be configured as a cylindrical hole which projects laterally through the respective mount 84. The handle slot 88 is positioned at a front end of the mount portion 76, and longitudinally between the handle aperture 86 and the handle front end 68. This handle slot 88 extends substantially (or completely) vertically within the respective mount 84 along a major axis of the handle slot 88. The handle slot 88 extends laterally through the respective mount 84.

Figure 8:
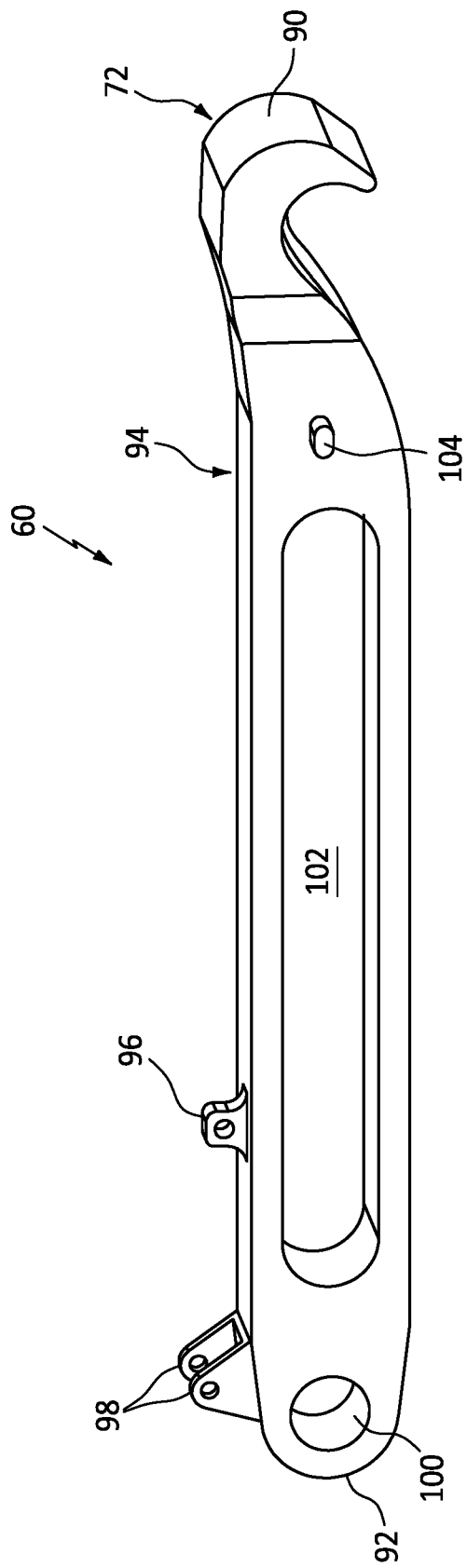
FIG. 8 is a perspective illustration of a hook structure for the latch.

Referring to FIG. 8, the hook structure 60 extends longitudinally (when closed) between and to a front end 90 of the hook structure 60 and a back end 92 of the hook structure 60. The hook structure 60 includes a hook structure base 94 and the structure hook 72 connected to the structure base 94 at the structure front end 90. The hook structure 60 may also include a cover assembly stopper 96 and/or one or more cover assembly mounts 98; e.g., tabs, flanges, etc.

The structure base 94 extends longitudinally from the structure back end 92 to the structure hook 72. The structure base 94 includes a hook structure mounting aperture 100 ("structure aperture") and a hook structure slot 102. The structure base 94 may also include one or more catches 104 (one visible in FIG. 8); e.g., protrusions, posts, etc. The structure aperture 100 is disposed at the structure back end 92. This structure aperture 100 may be configured as a cylindrical hole which projects laterally through the structure base 94. The structure slot 102 is located longitudinally between the structure aperture 100 and the structure hook 72 along the hook structure 60. This structure slot 102 extends longitudinally within the hook structure 60 and its structure base 94 along a major axis of the structure slot 102. A longitudinal length of this structure slot 102 along its major axis may be at least forty percent (40%), fifty percent (50%), sixty percent (60%) or seventy percent (70%) of a longitudinal length of the entire hook structure 60. The structure slot 102 extends laterally through the hook structure 60 and its structure base 94. The catches 104 are arranged on opposing lateral sides of the structure base 94. Each of the catches 104 is located longitudinally between the structure slot 102 and the structure hook 72. Each of the catches 104 projects laterally out from a base (e.g., a beam) of the structure base 94 to a distal end of the respective catch 104.

The stopper 96 is connected to the structure base 94. The stopper 96 projects vertically outward from the structure base 94 to a distal end of the stopper 96. The stopper 96 of FIG. 8 is positioned longitudinally along the structure slot 102, and longitudinally between cover assembly mounts 98 and the catches 104.

The cover assembly mounts 98 are connected to the structure base 94. The cover assembly mounts 98 are disposed at the structure back end 92. The cover assembly mounts 98, for example, may be longitudinally aligned with or overlap the structure aperture 100. The cover assembly mounts 98 are laterally spaced from one another. Each of the cover assembly mounts 98 projects vertically outward from the structure base 94 to a distal end of the respective cover assembly mount 98.

Referring to FIGS. 6 and 7, the linkage system 62 includes one or more sets of linkages. These linkage sets are arranged on opposing lateral sides of the hook structure 60. Each linkage set of FIGS. 6 and 7 includes a front link 106, a back link 108 and a center link 110, where each of the links 106, 108, 110 may be configured as a fixed length, unitary (e.g., single body) linkage arm; e.g., a strut. The linkage system 62 of FIGS. 6 and 7 also includes a front link pivot member 112 ("front pivot member"), a back link pivot member 114 "back pivot member") and a center link pivot member 116 ("center pivot member").

Referring to FIG. 9, the front link 106 extends longitudinally between and to a front end 118 of the front link 106 and a back end 120 of the front link 106. The front link 106 includes a front link base 122, a front link aperture 124 and a front link mount 126; e.g., a multi-tiered cylindrical protrusion such as a boss. The front link base 122 extends longitudinally between and to the front link front end 118 and the front link back end 120. The front link aperture 124 is disposed at the front link front end 118. This front link aperture 124 may be configured as a cylindrical hole which projects laterally though the front link 106 and its base 122. The front link mount 126 is disposed to a side of the front link base 122. This front link mount 126 is disposed at or near the front link back end 120. The front link mount 126 is connected to and projects laterally out from the front link base 122. In particular, the front link mount 126 of FIG. 9 includes a cylindrical base portion 128 and a cylindrical end portion 130. The end portion 130 may be coaxial with the base portion 128. The end portion 130 has a smaller size (e.g., diameter) than the base portion 128. The base portion 128 projects laterally out from the front link base 122 to the end portion 130. The end portion 130 projects laterally out from the base portion 128 to a distal end of the front link mount 126.

Referring to FIG. 10, the back link 108 extends longitudinally between and to a front end 132 of the back link 108 and a back end 134 of the back link 108. The back link 108 includes a back link base 136, a back link aperture 138 and a back link mount 140; e.g., a cylindrical protrusion such as a boss. The back link base 136 extends longitudinally between and to the back link front end 132 and the back link back end 134. The back link aperture 138 is disposed at the back link back end 134. This back link aperture 138 may be configured as a cylindrical hole which projects laterally though the back link 108 and its base 136. The back link mount 140 is disposed to a side of the back link base 136. This back link mount 140 is disposed at the back link front end 132. The back link mount 140 is connected to and projects laterally out from the back link base 136 to a distal end of the back link mount 140.

Figure 11:
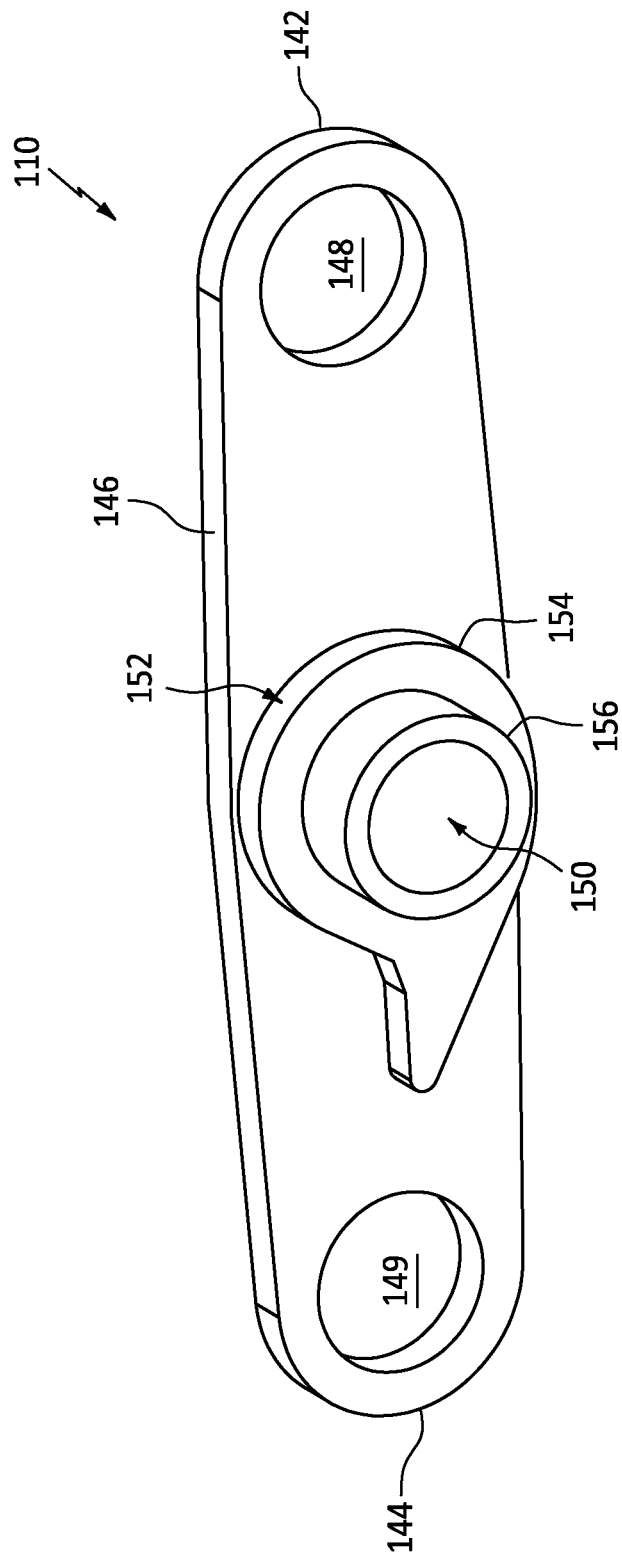
FIG. 11 is a perspective illustration of a center link for the latch.

Referring to FIG. 11, the center link 110 extends longitudinally between and to a front end 142 of the center link 110 and a back end 144 of the center link 110. The center link 110 includes a center link base 146, one or more center link apertures 148-150 and a center link mount 152; e.g., an annular multi-tiered protrusion such as a boss. The center link base 146 extends longitudinally between and to the center link front end 142 and the center link back end 144. The front center link aperture 148 is disposed at the center link front end 142. The back center link aperture 149 is disposed at the center link back end 144. The intermediate center link aperture 150 is disposed longitudinally between the front center link aperture 148 and the back center link aperture 149 along the center link 110 and its base 146. The intermediate center link aperture 150, for example, may be longitudinally centered (e.g., midway) between the front center link aperture 148 and the back center link aperture 149. Each of the center link apertures 148-150 may be configured as a cylindrical hole which projects laterally through the center link 110. In particular, the front center link aperture 148 and the back center link aperture 149 each project through the center link base 146. The intermediate center link aperture 150 projects laterally through the center link base 146 and the center link mount 152. The center link mount 152 is disposed longitudinally between the front center link aperture 148 and the back center link aperture 149 along the center link 110 and its base 146. The center link mount 152, for example, may be longitudinally centered (e.g., midway) between the front center link aperture 148 and the back center link aperture 149. The center link mount 152 is disposed to a side of the center link base 146. This center link mount 152 is connected to and projects laterally out from the center link base 146. In particular, the center link mount 152 of FIG. 11 includes a (e.g., annular) base portion 154 and a (e.g., annular) cylindrical end portion 156. The end portion 156 may be generally coaxial with the base portion 154. The end portion 156 has a smaller size (e.g., diameter) than the base portion 154. The base portion 154 projects laterally out from the center link base 146 to the end portion 156. The end portion 156 projects laterally out from the base portion 154 to a distal end of the center link mount 152.

Referring to FIGS. 6 and 7, within each linkage set, the front link mount 126 is mated with the front center link aperture 148 (see also FIG. 11) and the handle slot 88. The front link mount 126, in particular, projects laterally through the front center link aperture 148 and into the handle slot 88. The base portion 128 (see FIG. 9) is received and pivotable within the front center link aperture 148 (see FIG. 11). The end portion 130 is received, pivotable and translatable within the handle slot 88. With this arrangement, the front link 106 is pivotally coupled to the center link 110 and the handle 58 as well as translatable within and along the handle slot 88. In addition, the front pivot member 112 is mated with the structure slot 102 and the front link apertures 124 of both front links 106. The front pivot member 112, in particular, projects sequentially through the front link aperture 124 in a first of the front links 106, the structure slot 102 and the front link aperture 124 in a second of the front links 106. The front pivot member 112 is received and pivotable within each of the front link apertures 124, and the front pivot member 112 is received, pivotable and translatable within the structure slot 102. With this arrangement, each front link 106 is pivotally coupled to the hook structure 60 and translatable longitudinally along the structure slot 102. The front pivot member 112 of FIGS. 6 and 7 is configured as a cylindrical tubular sleeve. The latch anchor 56 of FIGS. 1 and 2 may thereby project through a bore of the front pivot member 112 to pivotally anchor the latch 46 to the first component 22. It is contemplated, however, the front pivot member 112 may alternatively be configured as an integral part of the latch anchor 56; e.g., the latch anchor 56 may replace the functionality of the front pivot member 112.

Referring to FIGS. 6 and 7, within each linkage set, the back link mount 140 is mated with the back center link aperture 149. The back link mount 140, in particular, projects laterally into the back center link aperture 149. The back link mount 140 is received and pivotable within the back center link aperture 149. With this arrangement, the back link 108 is pivotally coupled to the center link 110. In addition, the back pivot member 114 is mated with the structure aperture 100 (see FIG. 8) and the back link apertures 138 (see FIG. 10) of both back links 108. The back pivot member 114, in particular, projects sequentially through the back link aperture 138 in a first of the back links 108, the structure aperture 100 (see FIG. 8) and the back link aperture 138 in a second of the back links 108. The back pivot member 114 is received and pivotable within each of the apertures 100 and 138 (see FIGS. 8 and 10). With this arrangement, each back link 108 is pivotally coupled to the hook structure 60 at a fixed longitudinal position along the hook structure 60. The back pivot member 114 of FIGS. 6 and 7 is configured as a capped cylindrical pin. The back pivot member 114, however, may alternatively be configured as a tubular sleeve, a fastener or any other element with a generally cylindrical bearing member.

Figure 12:
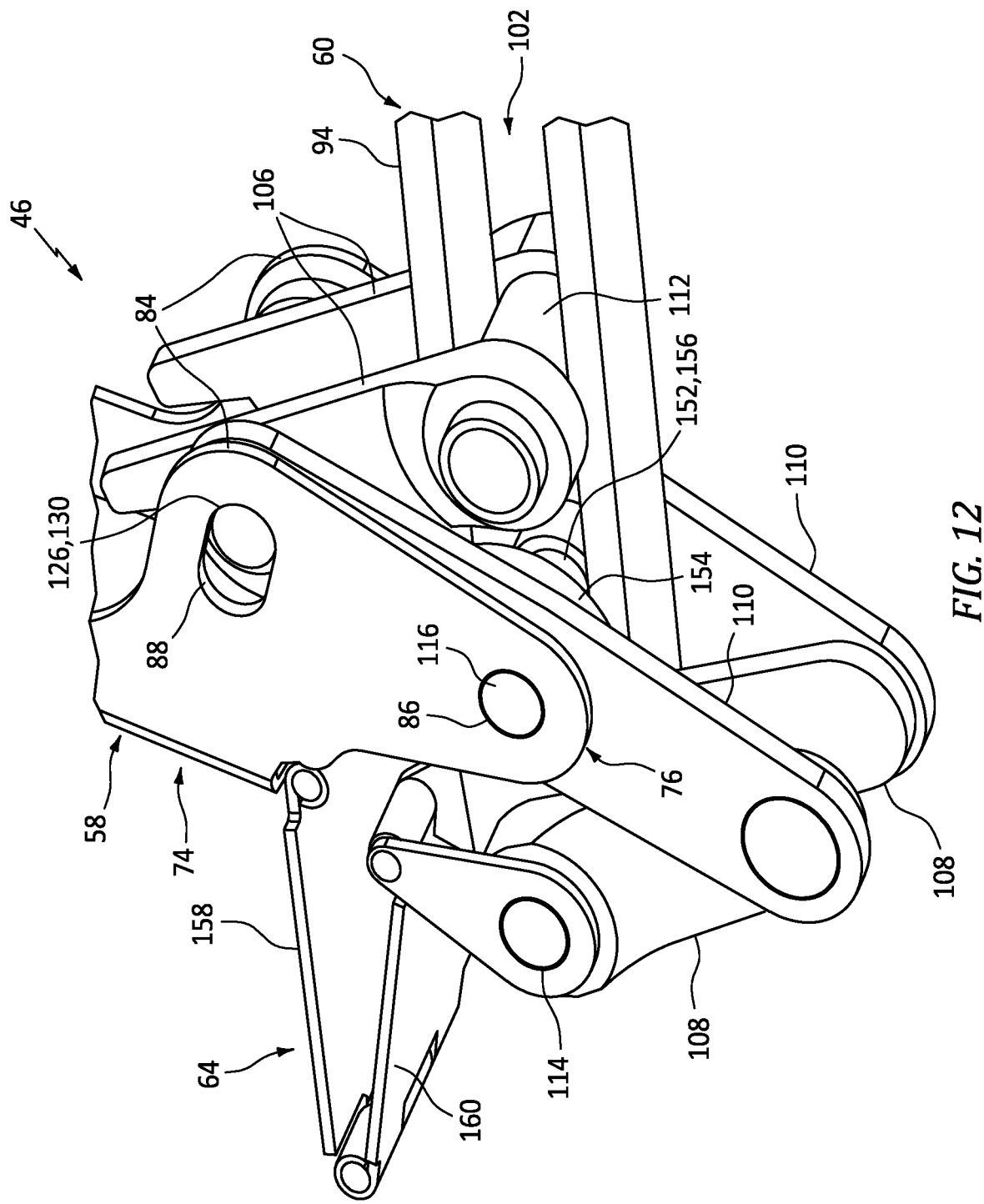
FIG. 12 is a partial perspective illustration of the latch in its open position.

Referring to FIG. 12, within each linkage set, the center link mount 152 is mated with the structure slot 102. The base portion 154, in particular, is laterally abutted against the hook structure 60 and its structure base 94. The center link mount 152 and its end portion 156 project partially laterally into the structure slot 102. The center link mount 152 and its end portion 156 are received, pivotable and translatable within the structure slot 102. In addition, the center pivot member 116 is mated with the structure slot 102, the intermediate center link apertures 150 (see FIG. 11) of both center links 110 and the handle apertures 86 of both handle mounts 84. The center pivot member 116, in particular, projects sequentially through the handle aperture 86 in a first of the handle mounts 84, the intermediate center link aperture 150 in a first of the center links 110, the structure slot 102, the intermediate center link aperture 150 in a second of the center links 110, and the handle aperture 86 in a second of the handle mounts 84. The center pivot member 116 is received and pivotable within each of the handle apertures 86 and each of the intermediate center link aperture 150. The center pivot member 116 is received, pivotable and translatable within the structure slot 102. With this arrangement, the handle 58 and each center link 110 is pivotally coupled to the hook structure 60 and translatable longitudinally along the structure slot 102. The center pivot member 116 of FIG. 12 is configured as a cylindrical pin. The center pivot member 116, however, may alternatively be configured as a tubular sleeve, a fastener or any other element with a generally cylindrical bearing member.

Figure 13:
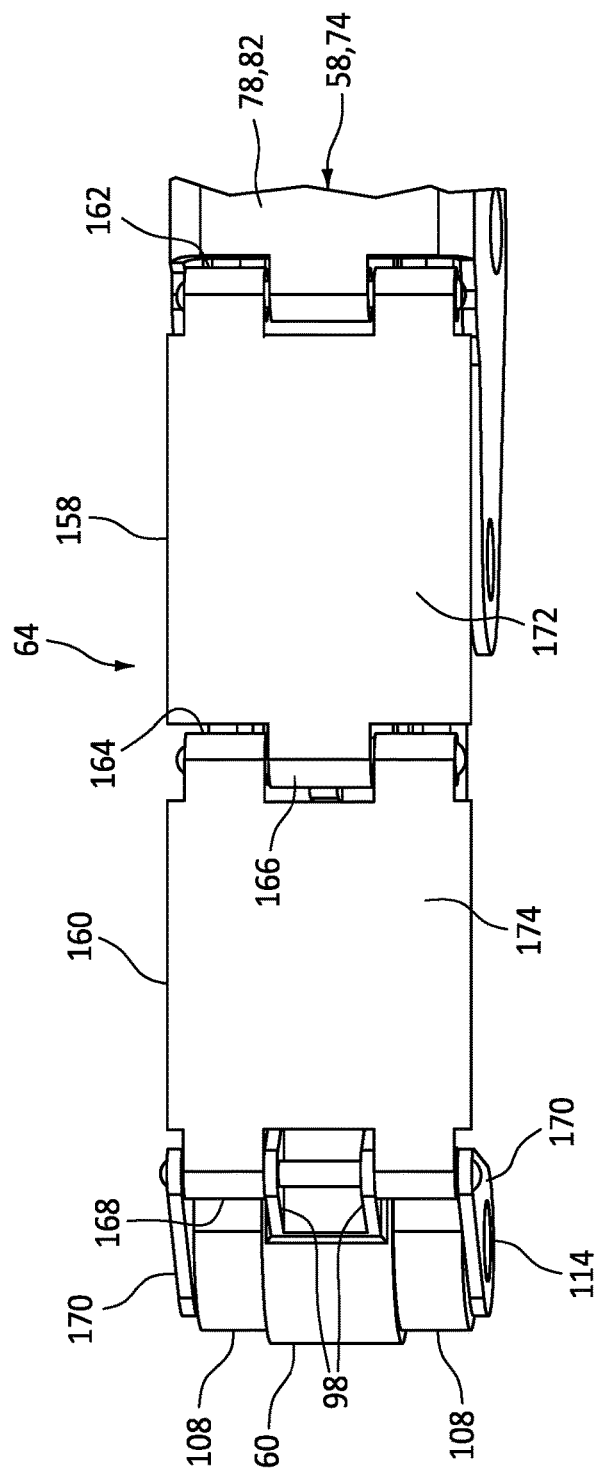
FIGS. 13 and 14 are partial perspective illustrations of the latch in its closed position.
Figure 14:
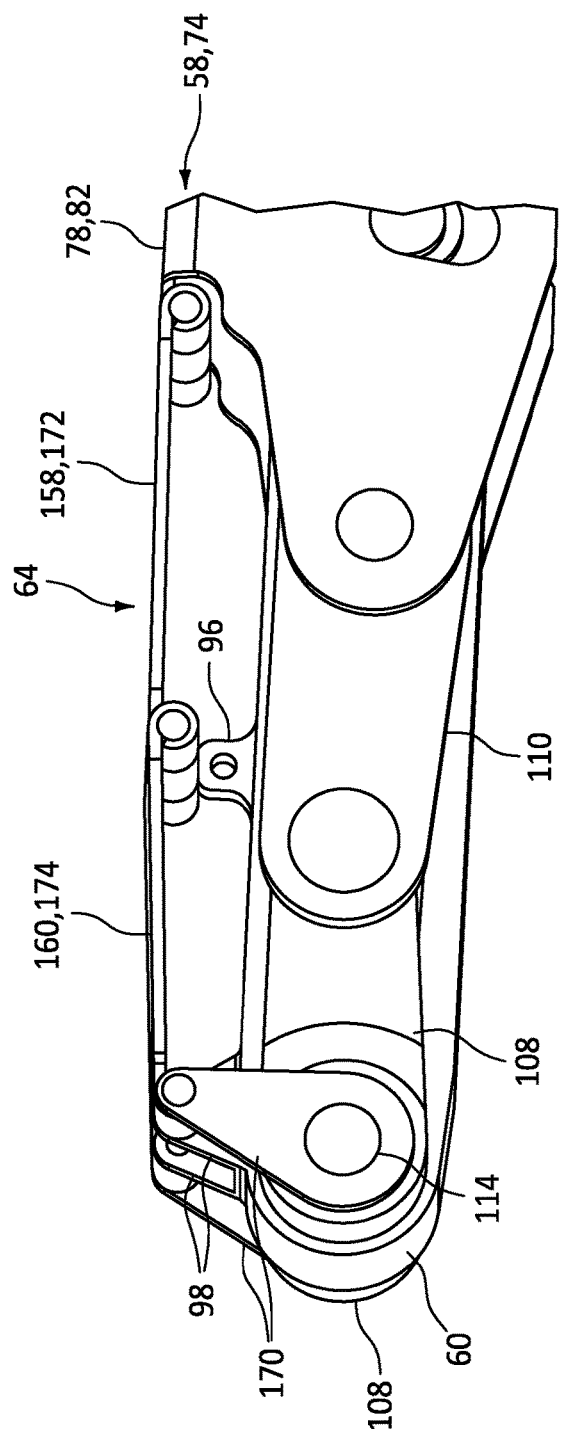

Referring to FIG. 13, the cover assembly 64 includes a front cover plate 158 and a back cover plate 160. Each of these cover plates 158 and 160 extends longitudinally between and to a front end 162, 164 of the respective cover plate 158, 160 and a back end 166, 168 of the respective cover plate 158, 160. The front cover plate 158 is pivotally coupled to the handle 58. The front plate front end 162, for example, is pinned or otherwise hinged to a back end of the handle base 78. The back cover plate 160 is pivotally coupled to the hook structure 60. The back plate back end 168, for example, is pinned or otherwise hinged to the cover assembly mounts 98. This back cover plate 160 and its back end 168 may also be pinned or otherwise hinged to one or more end caps 170 (e.g., flanges, ears, etc.) connected to and on opposing lateral sides of the back pivot member 114. The back cover plate 160 is also pivotally connected to the front cover plate 158. The back plate front end 164, for example, is pinned or otherwise hinged to the front plate back end 166. Referring to FIG. 14, this coupling (or another portion of the cover assembly 64) may be configured to abut against the stopper 96 when the latch assembly 26 and its handle 58 are closed to facilitate folding out of the cover assembly 64 (see FIGS. 7 and 12) when the handle 58 and the latch assembly 26 and its handle 58 are opened. With the foregoing arrangement, referring to FIG. 1, the cover assembly 64 and its cover plates 158 and 160 are configured to cover a back end of the latch 46. An exterior surface 172, 174 of each of the cover plates 158 and 160, for example, may be inline with (e.g., parallel and/or flush with) the exterior aerodynamic surface 36 and/or the handle base 78 and its exterior surface 82. The cover assembly 64 and its cover plates 158 and 160 may thereby function as an extension of the handle 58 and its handle base 78 when the latch assembly 26 and its handle 58 are closed.

Figure 15B:
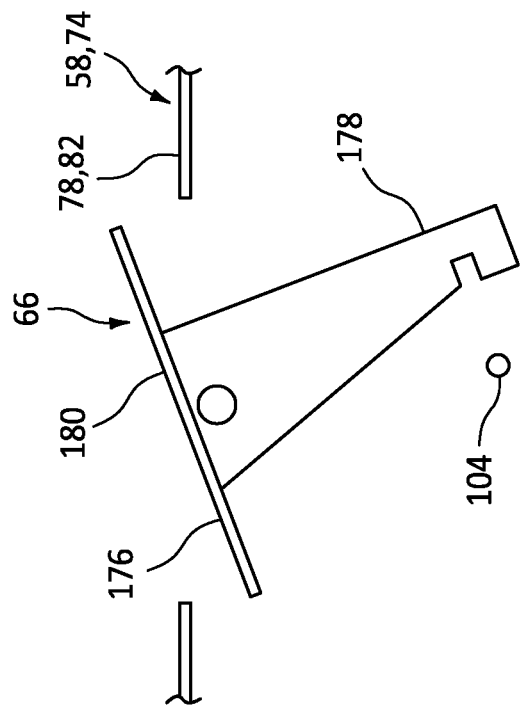
FIGS. 15A and 15B are schematic sectional illustrations of a portion of the latch assembly with a handle release device in various positions.
Figure 15A:
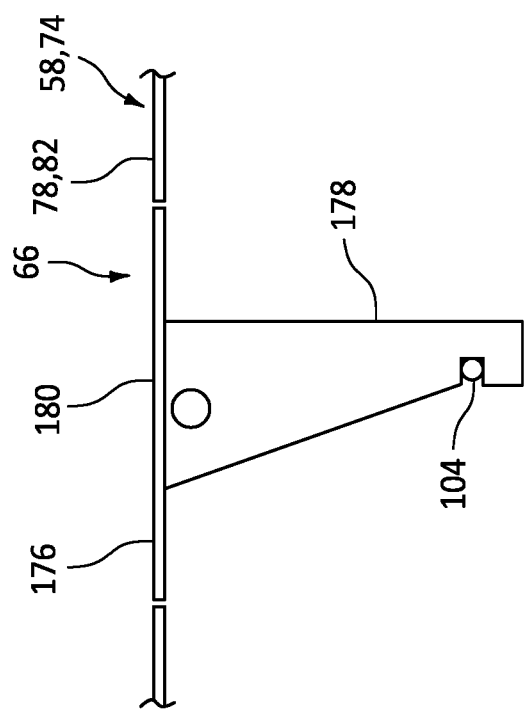

Referring to FIGS. 6 and 7, the handle release device 66 is pivotally coupled to the handle 58. The handle release device 66, for example, includes a push button 176 (e.g., a planar panel) and a device latch 178. The device latch 178 is connected to and projects out from the push button 176. This device latch 178 may be pivotally coupled to the grip portion 74 and its handle rails 80 by a pin connection. With this arrangement, the handle release device 66 may pivot between a first (e.g., locked) position (e.g., see FIG. 15A) and a second (e.g., unlocked) position (e.g., see FIG. 15B). In the first position of FIGS. 15A, the push button 176 may be seated in an aperture (e.g., a port) through the grip portion 74 and its handle base 78. The push button 176 and an exterior surface 180 of that push button 176 may be inline with (e.g., parallel and/or flush with) the exterior aerodynamic surface 36 and/or the handle base 78 and its exterior surface 82. The push button 176 may thereby be in an undepressed position. Here, the device latch 178 may engage (e.g., latch onto) the catches 104 (one visible in FIG. 15A). With the handle release device 66 in its first position, the handle release device 66 may lock (e.g., secure) the handle 58 closed. By contrast, in the second position of FIG. 15B, the push button 176 may project into the handle 58 and the push button 176 and its exterior surface 180 may be angularly offset from the handle base 78 and/or the exterior aerodynamic surface 36. The push button 176 may thereby be in a depressed position. Here, the device latch 178 may disengage (e.g., release) the catch 104. With the handle release device 66 in its second position, the handle release device 66 unlocks the handle 58.

Figure 5:
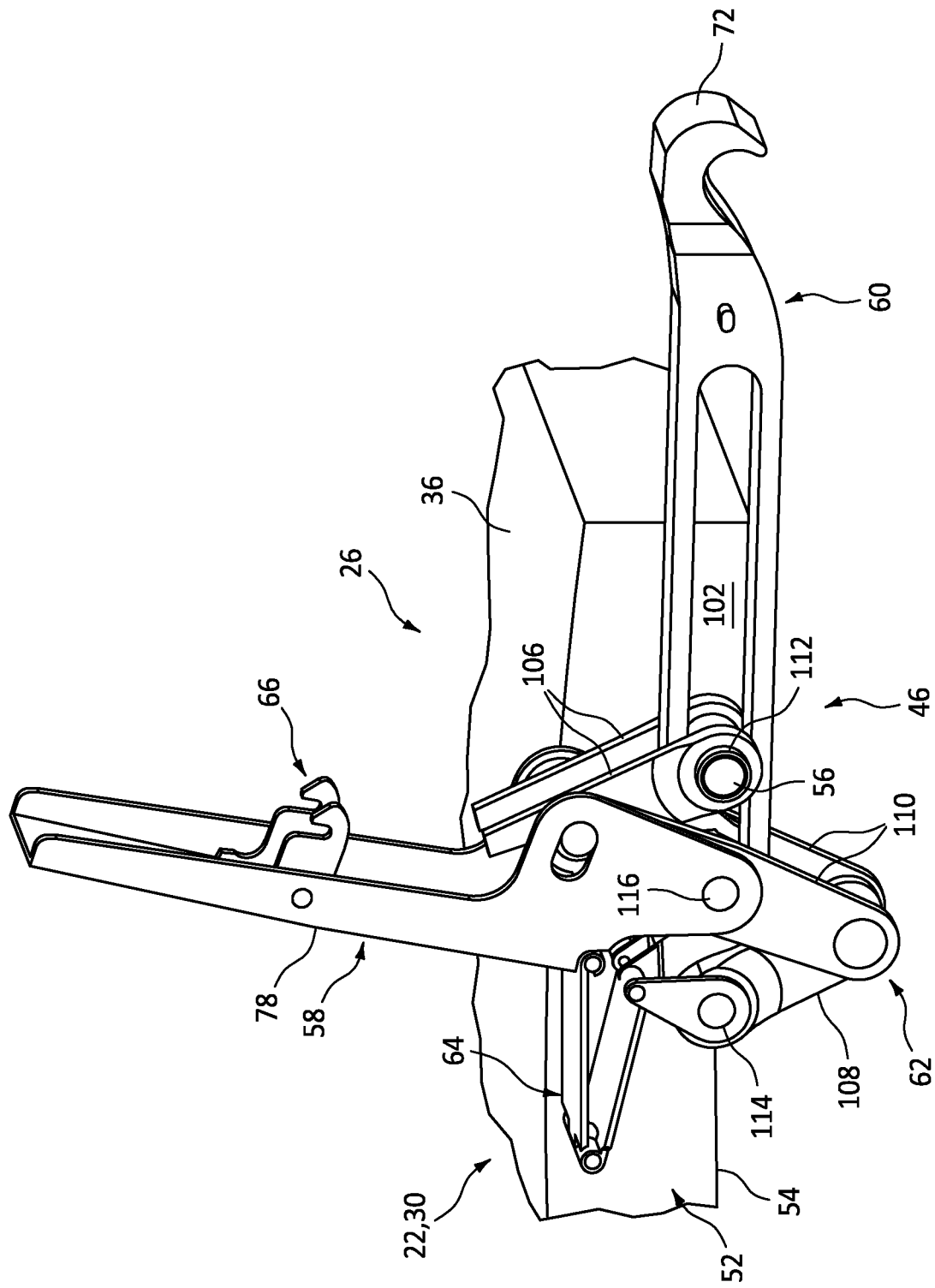
FIG. 5 is a partial cutaway perspective illustration of the aircraft assembly with its latch in an open position.

Referring to FIGS. 1 and 5, the handle 58 is configured to move between a fully closed position (e.g., see FIG. 1) and a fully open position (e.g., see FIG. 5). In the closed position of FIG. 1, the latch 46 and its members 58, 60 and 62 may be disposed within the fitting channels 48 and 52 and the handle base 78, the cover plates 158 and 160 and the push button 176 may be inline with the exterior aerodynamic surface 36. The hook structure 60 may also engage the keeper 44. More particularly, the hook 72 may latch onto (e.g., grasp, partially wrap around and contact, etc.) the keeper 44. With this closed/locked latch assembly arrangement, the latch 46 may be locked onto the keeper 44 and the latch assembly 26 may maintain/secure the aircraft components 22 and 24 in their closed positions. By contrast, in the open position of FIG. 5, the latch 46 and its links 106, 108 and 110 may fold (e.g., scissor) open and the links 106 and 110 project out from the first component channel 52, and the handle base 78 may be angularly offset from the exterior aerodynamic surface 36. To facilitate this opening, the center pivot member 116 and the front pivot member 112 (although actually remaining in a fixed position relative to the first component 22) translate along the hook structure 60 and its structure slot 102. This shifts the hook 72 in a forward direction allowing the hook 72 to disengage from the keeper 44 (see FIG. 1). More particularly, the hook 72 may no longer latch onto and/or contact the keeper 44 (see FIG. 1). With this open/unlocked latch assembly arrangement, the latch 46 may be unlocked from the keeper 44 allowing the aircraft components 22 and 24 to move relative to one another; e.g., allowing pivoting open of one or more of the aircraft components 22 and 24. By facilitating the above folding (e.g., scissoring) movement between the front link 106, the center link 110 and the back link 108 as well as facilitating translation of the front pivot member 112 and the center pivot member 116 within and along the structure slot 102, the latch 46 of the present disclosure increases (e.g., doubles) its throw compared to a traditional prior art latch with a two link actuation mechanism.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft, comprising:
a latch including a handle, a hook structure and a linkage system operatively coupling the handle to the hook structure, the linkage system including a back link, a center link, a back link pivot member and a center link pivot member;
the hook structure including a hook, a structure aperture and a structure slot located longitudinally between the hook and the structure aperture;
the back link pivotally coupled to the center link;
the back link pivot member received within the structure aperture and pivotally coupling the back link to the hook structure;
the center link pivot member received within the structure slot and pivotally coupling the handle and the center link together and to the hook structure;
the linkage system further including a front link and a front link pivot member;
the front link pivotally coupled to the center link; and
the front link pivot member received within the structure slot and pivotally coupling the front link to the hook structure.

2. The apparatus of claim 1, wherein the center link pivot member is configured to translate longitudinally within the structure slot as at least one of the handle or the center link pivots relative to the hook structure.

3. The apparatus of claim 1, wherein the front link pivot member is configured to translate longitudinally within the structure slot as at least one of the handle or the center link pivots relative to the hook structure.

4. The apparatus of claim 1, wherein the front link pivot member is longitudinally between the center link pivot member and the hook.

5. The apparatus of claim 1, wherein
the handle includes a handle slot; and
the front link includes a protrusion that projects through the center link and into the handle slot.

6. The apparatus of claim 1, wherein
the back link is pivotally coupled to the center link at a back location;
the front link is pivotally coupled to the center link a front location; and
the center link pivot member is disposed at a center location between the back location and the front location along the center link.

7. The apparatus of claim 1, further comprising:
a latch housing comprising a channel;
the latch disposed within the channel; and
a fastener projecting through the front link pivot member to mount the latch to the latch housing.

8. The apparatus of claim 1, wherein
the latch further includes a back cover plate and a front cover plate pivotally coupled to the back cover plate;
the back cover plate is pivotally coupled to the hook structure; and
the front cover plate is pivotally coupled to the handle.

9. The apparatus of claim 8, wherein the back cover plate, the front cover plate and an exterior of the handle are inline and substantially parallel when the handle is in a closed position.

10. The apparatus of claim 1, wherein
the latch further includes a handle release device with a push button;
the handle release device is configured to lock the handle in a closed position when the push button is in a first position;
the handle release device is configured to unlock the handle from the closed position when the push button is in a second position.

11. The apparatus of claim 10, wherein the push button is nested in an aperture in the handle.

12. The apparatus of claim 10, wherein the handle release device is pivotally mounted to the handle.

13. The apparatus of claim 1, further comprising:
a keeper;
the handle configured to move between a closed position and an open position;
the hook engaged with the keeper when the handle is in the closed position; and
the hook disengaged from the keeper when the handle is in the open position.

14. The apparatus of claim 13, further comprising:
a fixed structure;
a first aircraft component pivotally attached to the fixed structure, the latch mounted to the first aircraft component; and
a second aircraft component pivotally attached to the fixed structure, the keeper mounted to the second aircraft component.

15. An apparatus for an aircraft, comprising:
a latch including a handle, a hook structure and a linkage system operatively coupling the handle to the hook structure, the linkage system including a front link, a center link, a front link pivot member and a center link pivot member;
the hook structure comprising a structure slot;
the front link pivotally coupled to the center link;
the front link pivot member received within the structure slot and pivotally coupling the front link to the hook structure; and
the center link pivot member received within the structure slot and pivotally coupling the handle and the center link together and to the hook structure.

16. The apparatus of claim 15, wherein
the center link pivot member is configured to translate longitudinally within the structure slot as at least one of the handle or the center link pivots relative to the hook structure; and
the front link pivot member is configured to translate longitudinally within the structure slot as at least one of the handle or the center link pivots relative to the hook structure.

17. The apparatus of claim 15, wherein
the hook structure further comprises a hook; and
the front link pivot member is longitudinally between the center link pivot member and the hook along the hook structure.

18. The apparatus of claim 15, wherein the latch further includes a back link that is independently pivotally coupled to the hook structure and the center link.

19. An apparatus for an aircraft, comprising:
a keeper; and
a latch including a handle and a hook structure operatively coupled to the handle, the handle configured to move between a closed position and an open position, the hook structure engaged with the keeper when the handle is in the closed position, and the hook structure disengaged from the keeper when the handle is in the open position; and
the latch further including a back cover plate and a front cover plate pivotally coupled to the back cover plate, the back cover plate pivotally coupled to the hook structure, the front cover plate pivotally coupled to the handle, and the back cover plate, the front cover plate and an exterior of the handle inline when the handle is in the closed position.

\* \* \* \* \*